United States Patent
Bhattacharyya et al.

(10) Patent No.: US 7,761,696 B1
(45) Date of Patent: Jul. 20, 2010

(54) QUIESCING AND DE-QUIESCING POINT-TO-POINT LINKS

(75) Inventors: Binata Bhattacharyya, Bangalore (IN); Ling Cen, Austin, TX (US); Rahul Pal, Bangalore (IN); Binoy Balan, Bangalore (IN); Baskaran Ganesan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 502 days.

(21) Appl. No.: 11/731,746

(22) Filed: Mar. 30, 2007

(51) Int. Cl.
*G06F 15/177* (2006.01)
(52) U.S. Cl. ....................................... 712/229
(58) Field of Classification Search ................ None
See application file for complete search history.

(56) References Cited

U.S. PATENT DOCUMENTS

| | | | |
|---|---|---|---|
| 5,170,472 A * | 12/1992 | Cwiakala et al. | 710/8 |
| 5,339,405 A * | 8/1994 | Elko et al. | 714/56 |
| 5,481,738 A * | 1/1996 | Bartow et al. | 709/220 |
| 5,694,617 A * | 12/1997 | Webb et al. | 710/40 |
| 6,009,488 A | 12/1999 | Kavipurapu | |
| 6,304,929 B1 * | 10/2001 | Wallach et al. | 710/302 |
| 6,957,221 B1 * | 10/2005 | Hart et al. | 707/100 |
| 7,447,934 B2 * | 11/2008 | Dasari et al. | 714/5 |
| 7,480,702 B2 * | 1/2009 | Cohn et al. | 709/220 |
| 2001/0052042 A1 * | 12/2001 | Wallach et al. | 710/103 |
| 2005/0229019 A1 * | 10/2005 | Azevedo et al. | 714/2 |

OTHER PUBLICATIONS

Singh, Bipin P., et al., "Synchronizing Control and Data Paths Traversed by a Data Transaction", US Patent Application filed Jun. 23, 2006 assigned U.S. Appl. No. 11/474,140.

\* cited by examiner

*Primary Examiner*—Eric Coleman
(74) *Attorney, Agent, or Firm*—Caven & Aghevli LLC

(57) ABSTRACT

Methods and apparatus to quiesce and/or de-quiesce links (such as point-to-point link) in a multi-processor system are described. In one embodiment, one or more bits are modified to indicate the status of quiesce/dequiesce processes.

19 Claims, 7 Drawing Sheets

QUIESCING AND DE-QUIESCING POINT-TO-POINT LINKS

BACKGROUND

The present disclosure generally relates to the field of electronics. More particularly, some embodiments relate to quiescing and/or de-quiescing point-to-point links in a multiprocessor system.

Some computers include multiple sockets to allow for utilization of multiple processors. For example, each socket may be coupled to a single processor or multiple processors. Generally, configuration of a computer system that is capable of utilizing multiple sockets and multiple processors occurs prior to system startup. Hence, reconfiguration of hardware resources in such systems may require the system to be rebooted, which may in turn add latency to system reconfiguration tasks.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

Some of the embodiments discussed herein may provide for efficient quiescence and de-quiescence of a computing system. Generally, quiescence may be used to allow for reconfiguration of components of a computing system without the need for rebooting of the system. For example, during the quiesce process various components of a computing system may be disabling, inactivated, or slowed down, e.g., on a temporary basis. In some embodiments, quiescence may result in power consumption reduction. In an embodiment, the hardware together with software may facilitate quiescence and de-quiescence in the same computing system. Given the complexity of such operations (e.g., quiesce/de-quiesce), the system may be more bug-tolerant when implemented according to one or more of the described embodiments. Various embodiments are discussed herein with reference to a computing system component, such as the components discussed herein, e.g., with reference to FIGS. 1-3 and 6-7.

Figure 1:
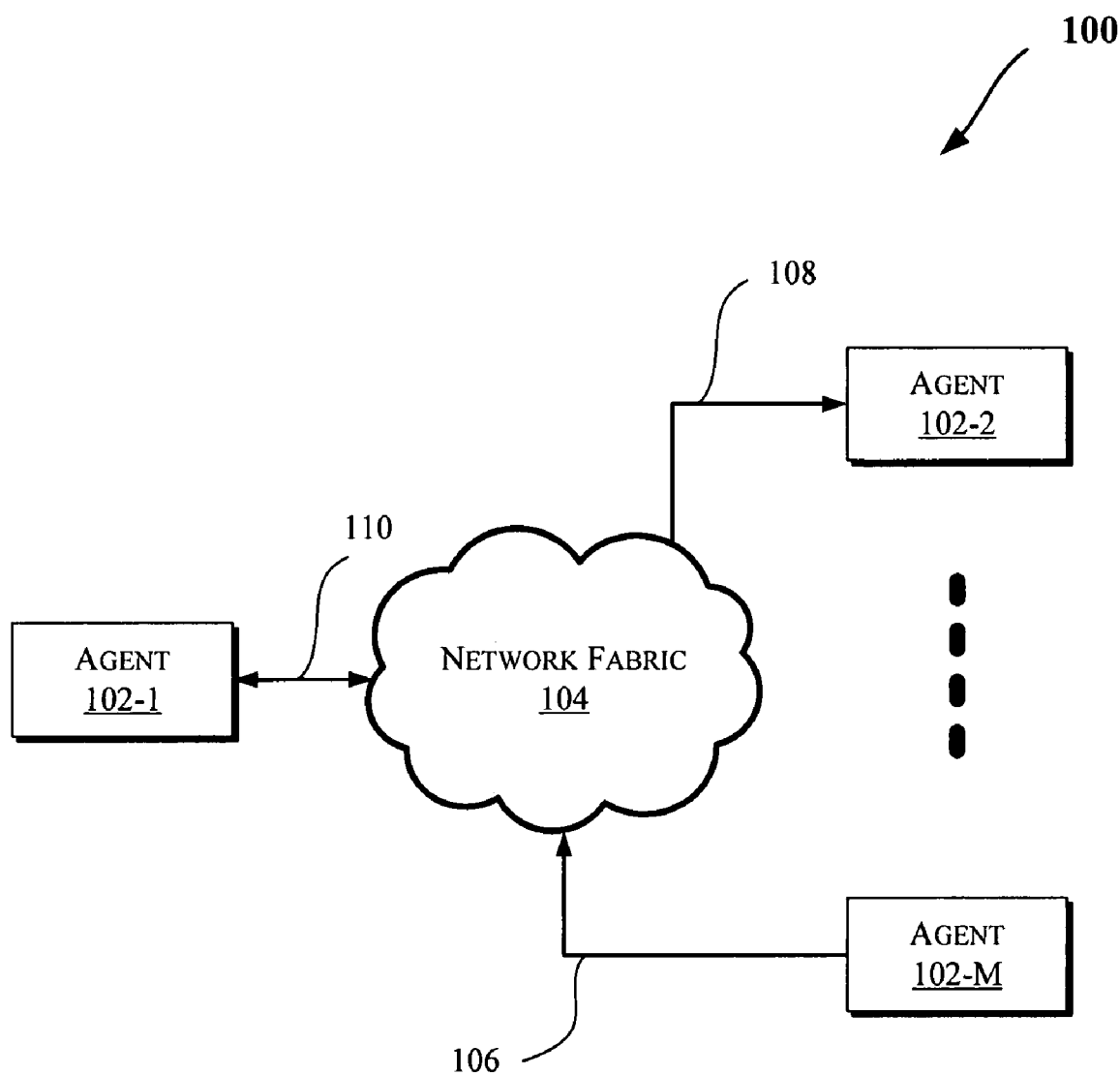
FIGS. 1-3 and 6-7 illustrate block diagrams of embodiments of computing systems, which may be utilized to implement various embodiments discussed herein.

More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, the agents 102 may be components of a computing system, such as the computing systems discussed with reference to FIGS. 2-3 and 6-7.

As illustrated in FIG. 1, the agents 102 may communicate via a network fabric 104. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Figure 2:
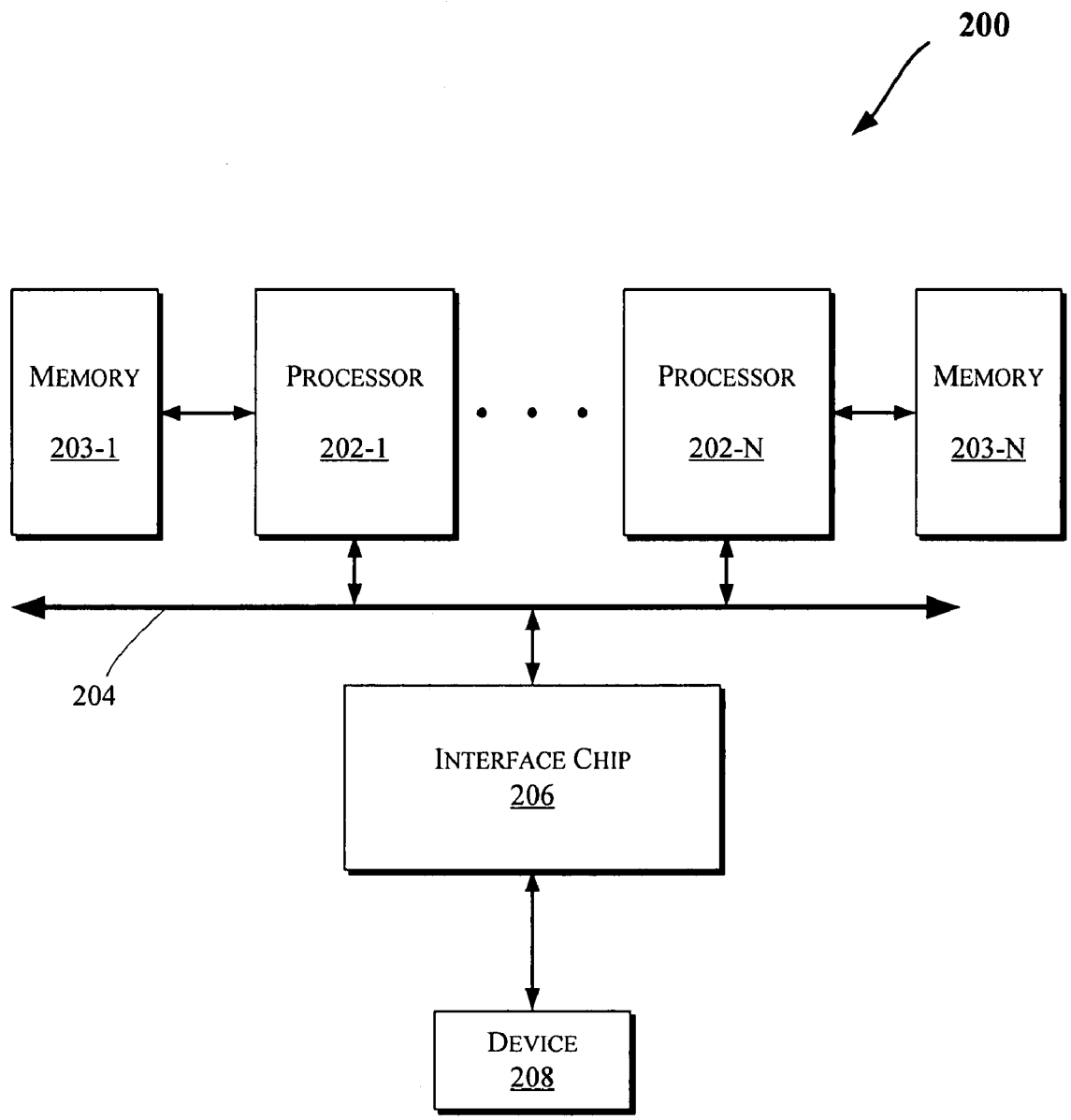

FIG. 2 illustrates a block diagram of portions of a computing system 200, according to an embodiment. In one embodiment, various components of the system 200 may be implemented by one of the agents 102-1 and/or 102-M discussed with reference to FIG. 1. Further details regarding some of the operation of the computing system 200 will be discussed herein with reference to FIGS. 4-5.

In accordance with an embodiment, each agent 102 may include the processor 202, memory 203, and/or interface chip 206 of FIG. 2. The system 200 may include one or more processors 202-1 through 202-N (collectively referred to herein as "processors 202" or more generally "processor 202"). Each of the processors 202-1 through 202-N may include various components. Also, as will be further discussed herein with reference to FIGS. 3 and 6-7, each processor 202 may include one or more processor cores (where each core may include a single or multiple hardware threads in some embodiments).

Each of the processors 202 may have access to a memory unit (e.g., memory units 203-1 through 203-N, respectively). Also, the processors 202 may communicate through a bus 204 with other components such as an interface chip 206. In an embodiment, the interface chip 206 may be a memory controller hub (MCH) or an input/output hub (IOH). Moreover, as will be further discussed with reference to FIG. 7, the processors 202 may communicate via a point-to-point (PtP)

connection with other components. Additionally, the logic 206 may communicate with a device 208 (which may be any type of a device such as a memory unit, an I/O device, etc.). In an embodiment, the device 208 may be a peripheral component interface (PCI) device such as a PCI express (PCIe) device that communicates in accordance with the PCIe Specification, Revision 2.0, October 2006. Also, more than one device (208) may communicate with the interface chip 206 in various embodiments.

Figure 3:
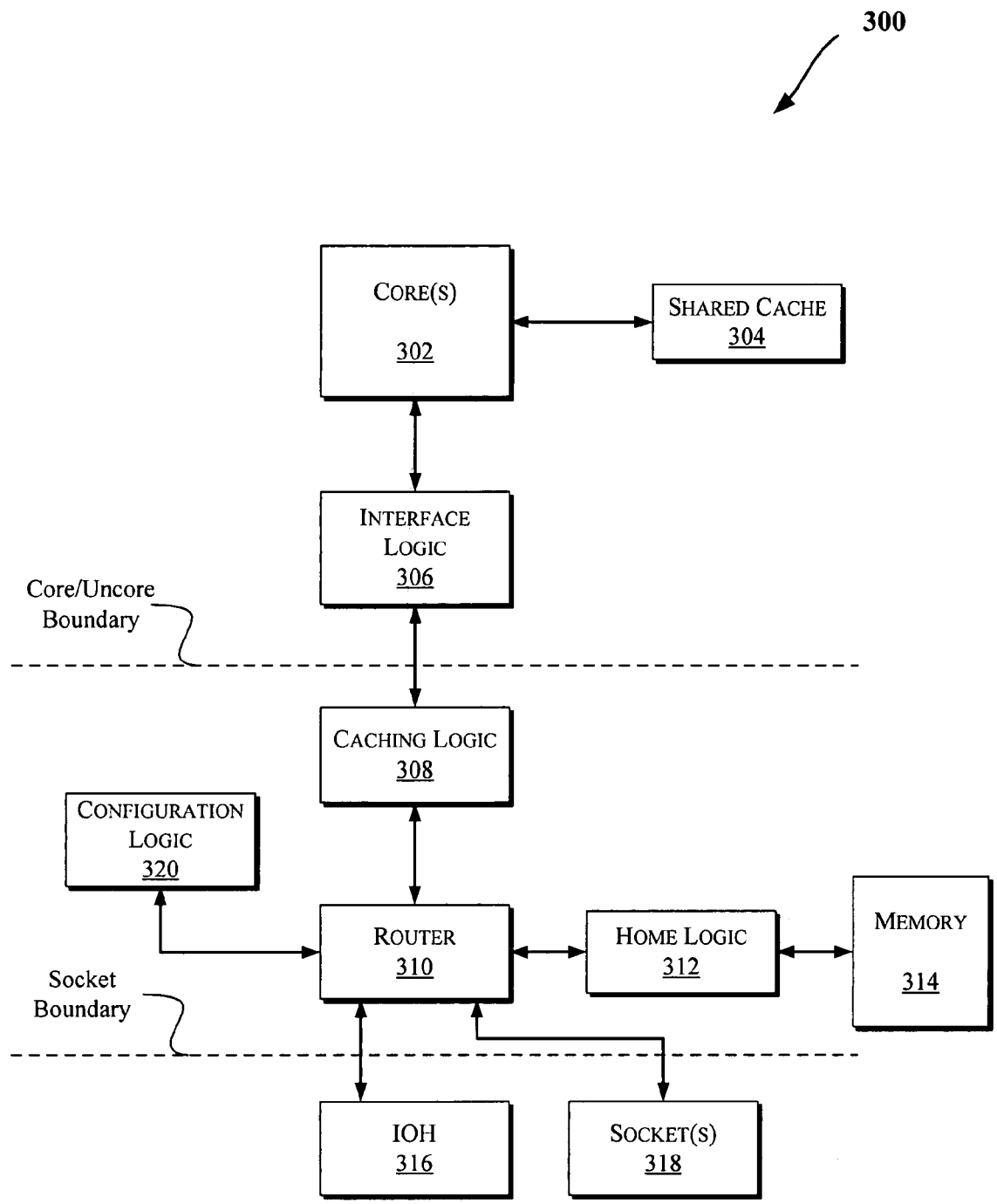

FIG. 3 illustrates a block diagram of various components of a computing system 300, according to an embodiment. In an embodiment, the computing system 300 may be the same or similar to the system 200 of FIG. 2. In one embodiment, various components of the system 300 may be implemented by one of the agents 102-1 and/or 102-M discussed with reference to FIG. 1. Moreover, at least some of the components of system 300 may be provided on a single integrated circuit (IC) die in an embodiment. For example, components 302-312, and 320 may be provided on a single IC die, e.g., to form a processor, such as the processor 202 of FIG. 2. In an embodiment, the same die may also include one or more of the components 314 and/or 316.

As shown in FIG. 3, the system 300 may include one or more processor cores 302 (collectively referred to herein as "cores 302" or more generally "core 302"). The cores 302 may communicate with each other through a shared bus or a point-to-point interface in various embodiments. In some embodiments, the cores 302 may include a cache (e.g., a level 1 (L1) cache and/or a level 2 (L2) cache). The cores 302 may have access to a shared cache 304, which may include various levels of cache such as a mid-level cache (MLC) or a last level cache (LLC). An interface logic 306 may provide a communication channel between the cores 302 and an uncore which may include a caching logic 308. In various embodiments, interface logic 306 may be used to interface messages and other transactions between cores 302 and a fabric with which the cores 302 communicate such as the fabric 104 discussed with reference to FIG. 1.

The interface logic 306 may include various structures such as buffers, queues, control or configuration status registers (CSRs), trackers, logic, etc. In this way, interface logic 306 may be a core interface that may be used to synchronize control and data portions of a transaction that may flow through independent paths. Thus, while not shown in FIG. 3 for ease of illustration, it is to be understood that multiple paths between cores 302 and interface logic 306 may exist. Furthermore, it is to be understood that these different paths may be independent in-order paths such that command and data portions of a data transaction arrive at interface logic 306 from cores 302 in the same order.

Furthermore, transactions may be provided from interface logic 306 to the caching logic 308. Certain coherent path requests may be processed in caching logic 308, which may be used to generate and control snoop traffic for example. In addition, caching logic 308 may provide data transactions from cores 302 to a router 310, e.g., for communication with other components of the system 300. Router 310 may determine based on information (e.g., address information) associated with a transaction whether the transaction is directed to a location within the system 300 or a remote component (e.g., off the chip that includes the router 310). Accordingly, router 310 may pass the transaction to a home logic 312 (from which the transaction may be forwarded to a memory unit 314 that may be the same as memory units 203 of FIG. 2 in an embodiment), an IOH 316, one or more sockets 318, and/or a configuration logic 320. In an embodiment, the router 310 may communicate with various components via a point-to-point interconnect. In an embodiment, the memory unit 314 may include a memory controller.

In some embodiments, the techniques discussed herein may be utilized in multi-socket, multi-processor computing server systems to support advanced reliability, accessibility, and serviceability (RAS) features such as dynamic domain partitioning (DDP), capacity on demand (COD), etc. to meet growing business requirements. DDP for instance refers to the ability to physically/logically/virtually partition the resources in one multi-socket system into different single/multi-socket systems and run different operation systems' (OS's) and applications that may not interfere with each other.

Dynamic reconfiguration may include online addition, deletion, and/or replacement (collectively referred to as "OL_*") of modules to support dynamic partitioning of a system, interconnect reconfiguration, memory RAS features such as migration and mirroring without requiring OS intervention, dynamic memory re-interleaving, processor and socket migration, and support for global shared memory across partitions. In an embodiment, for an OL_* operation, the ability of the firmware to quiesce the domain of interest may be provided such that several system resources, such as routing tables and address decoders, may be updated. Furthermore, some of the embodiments (such as those discussed with reference to FIGS. 4 and 5) may describe the quiescence and de-quiescence of a computer system in accordance with different methods. In some embodiments, hardware together with software may facilitate the described methods in the same system. Given the complexity of this operation (quiesce/de-quiesce), the system may be more bug-tolerant with this approach.

In an embodiment, each central processing unit (CPU) socket (e.g., one of the sockets 318) may be coupled to one or more cores (e.g., cores 302) which may communicate with each other through a bus cluster or interface logic 306, a caching Agent (CA) (e.g., caching logic 308), a routing agent (e.g., router 310), a home agent (e.g., home logic 312), a configuration agent (e.g., configuration logic 320), and physical layer agent or input/output (I/O) pads to couple to off-chip targets. The sockets may be coupled to each other using a cache-coherent interconnect technology (such as discussed with reference to FIG. 1). In an embodiment, the CA may receive the deferred local core read requests which misses local cache (304) and write requests/transactions or cache victimizations for memory access (e.g., access to the memory 314) and also responses of snoops originated on behalf of requests from other CAs in other sockets (318) in the system. The home agent may return the requested data while resolving access conflicts and maintaining memory coherence across the multi-core/multi-processor system. CA (e.g., along with home agent) may implement a cache-coherent protocol layer (such as MESI or MESIF where "M" stands for Modified, "E" for Exclusive, "S" for Shared, "I" for Invalid, and "F" for Forward). Routing agent may be responsible for routing packets from source to destination. The configuration agent may include one or more registers (e.g., CSR-Configuration Status Registers) and may maintain the chain of connections for configuring all the registers (CSRs) in all the agents or logics. In an embodiment, the configuration agent (e.g., logic 320) may be programmed by basic input/output system (BIOS) firmware programming.

Figure 4:
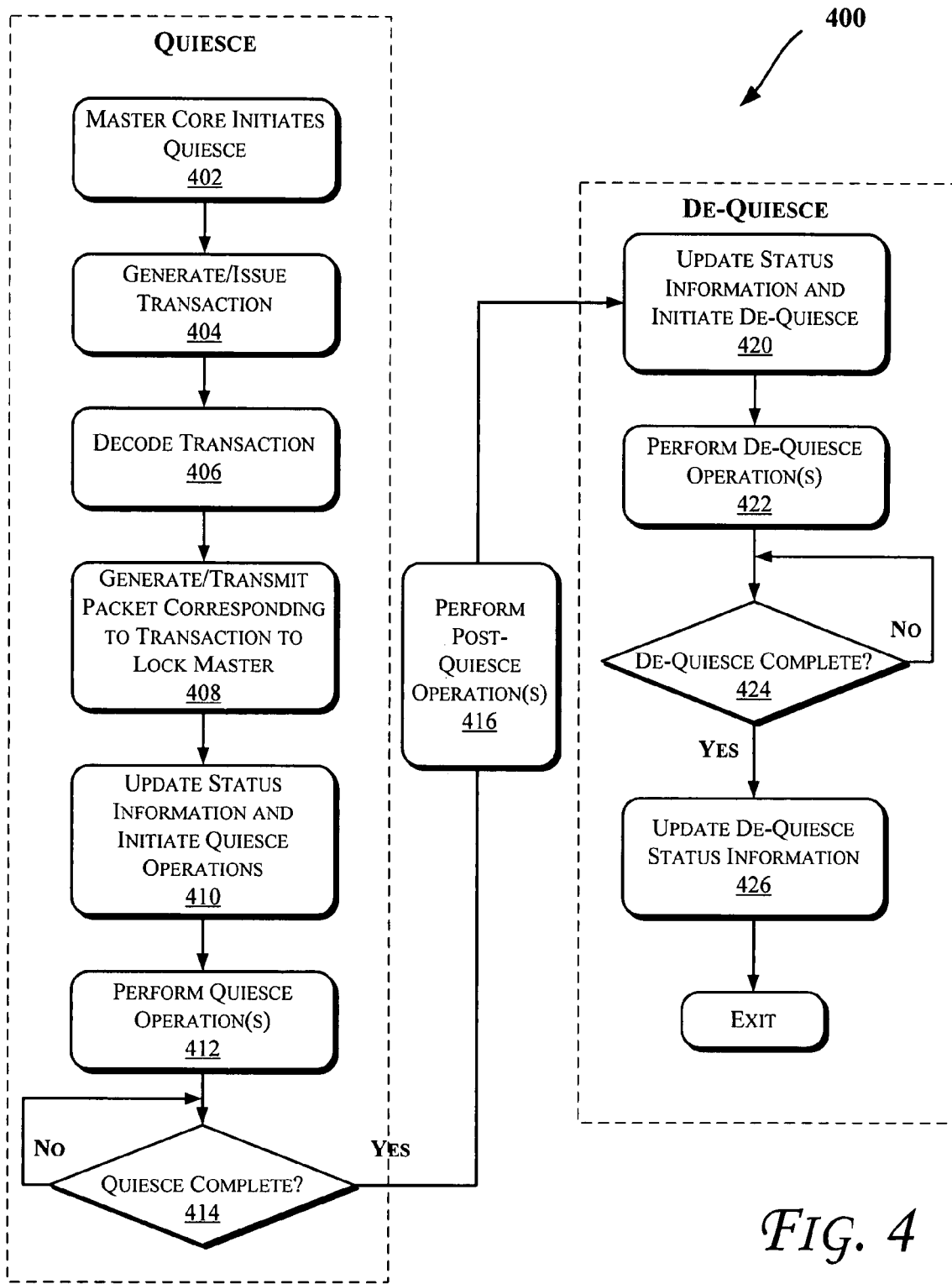
FIGS. 4-5 illustrate flow diagrams of methods according to some embodiments.

FIG. 4 illustrates a flow diagram of a method 400 to quiesce and de-quiesce a computing system, according to an embodiment. In an embodiment, the method 400 may be applied in a computing system with multiple processor cores and/or sockets, such as those discussed with reference to FIGS. 2, 3, and 6-7. Furthermore, various components discussed with reference to FIGS. 1-3 and 6-7 may be utilized to perform one or more of the operations discussed with reference to FIG. 4.

Referring to FIGS. 1-4, at an operation 402, a core (that may be referred to herein as a master core) may initiate the quiesce process. In an embodiment, as it is programmed by firmware, a quiesce master core (e.g., one of the cores 302) may make a CSR write to set a bit (e.g., a bit referred to as a "bsync" bit in some embodiments) which initiates the quiesce flow at operation 402. While the bsync bit corresponding to the master core is being set (or thereafter), the master core may generate and/or issue a quiesce request transaction at operation 404. For example, at operation 404, one of the cores 302 may generate and/or issue an uncacheable (UC) write transaction (e.g., corresponding to the quiesce request) targeted to a lock master IOH (e.g., the IOH 316 which will then act as the lock master for the computing system that includes the system 300) through a bus cluster such as the interface logic 306. The interface logic 306 may transmit the transaction to the caching logic 308.

At an operation 406, the transaction may be decoded to provide the identifier (ID) for the target destination. In an embodiment, a source address decoder logic (e.g., provided in the caching logic 308) may decode the transaction address and provide the destination node ID as lock master IOH Node ID. At an operation 408, the decoded information may be utilized to generate a packet corresponding to the transaction and transmit the packet to the off-chip lock master IOH (e.g., IOH 316) via the router 310 to physical layer or I/O pad to couple to an off-chip agent. In an embodiment, at operation 408, the caching logic 308 may generate a link layer packet (e.g., such as a common system interface (CSI) link layer packet) and transmit it to the router 310. Decode logic (e.g., within the router 310) may decode the destination node ID of the packet and route it to the appropriate off-chip IOH socket (e.g., IOH 316) which may be configured as lock master IOH.

At an operation 410, status information regarding the quiesce process may be updated and subsequently the quiesce operations may be initiated. In an embodiment, the lock master IOH of operation 408 may set a status register CSR field indicating "quiescing in progress." The lock master IOH may return a completion (CMP) response back to master core in acknowledgement for the received CSR write request for quiesce (operation 402) via router (310) and CA (308). Then, the lock master IOH may start the quiesce sequence (e.g., at operation 410), e.g., by sending a request (e.g., "StopReqX" in an embodiment) using a CSI packet to the configuration logic 320 that may be present in some or all sockets of the computing system 300. In some embodiments, at operation 410, configuration logic 320 (which may be provided in each socket) sets the CSR stop bit(s) in all the agents or boxes (in caching logic 308, interface logic 306, home logic 312, etc) and also in itself.

At an operation 412, various operations associated with the quiesce process may be performed. For example, the interface logic 306 queues may stop accepting requests from cores 302 and send retry requests to the cores. Thus, when all the read and write requests are retired after completion, the queues associated with the interface logic 306 may become empty as no new requests are accepted by the queues. The interface logic 306 may then set its drain status register CSR to indicate that its queues have been drained. Similarly, after all core requests are serviced from the caching logic 308 and home logic 312, the drain status register CSRs may be set in the caching logic 308 and the home logic 312. The drain status bits in the interface logic 306, caching logic 308, and the home logic 312 may drive a socket drain status register (e.g., provided in the configuration logic 320). After draining its own queues, the configuration logic may send the CMP signal back to lock master IOH for StopReqX which indicates the completion of quiesce sequence to lock Master IOH. After receiving the CMP (e.g., indicating acknowledgement) signal from all configuration logics 320 in all CPU sockets 318 and IOH sockets for the StopReqX, the lock Master IOH may finish system quiescing and change the status bit to "quiescing done." In an embodiment, the firmware at the master core may poll the lock master IOH to check the status of quiescing.

At an operation 414, it may be determined whether the quiesce process is completed. At an operation 416, one or more post-quiesce operations may be performed. In an embodiment, once quiesced (e.g., at operation 416), the master core may execute DDP software and/or RAS software. Also, at operation 416, one or more other tasks associated with the following may be performed: hot device add, hot device removal, partition, Periodic System Management Interrupt (PSMI) (which may execute a number of instructions to get into the deterministic buggy point to debug the system), etc. At an operation 420, corresponding status information may be updated, e.g., to initiate the de-quiesce process. When the software is done, the master core may reset its bsync CSR bit, e.g., by issuing a local CSR write to the interface logic 306. In an embodiment, the master core may also issue a CSR write to the lock master IOH to clear "quiesce" and start "de-quiesce." In some embodiments, a CSR write operation may be issued to the lock master IOH such as discussed with reference to operations 404-408. The lock master IOH may then set a status CSR field to indicate that the "de-quiesce in progress." The lock master IOH returns CMP for the CSR write.

At an operation 422, one or more operations corresponding to the de-quiesce may be performed. In an embodiment, the lock master IOH may start the de-quiesce sequence, e.g., by sending "StartReqX" to the configuration logics 320 in all the corresponding sockets 318. Then, the configuration logic 320 may reset the stop bit corresponding to the caching logic 308, home logic 312, interface logic 306, and in itself and may send a CMP signal to the lock master IOH (e.g., in acknowledgement) for StartReqX.

At an operation 424, it is determined whether the de-quiesce process is completed. Once the de-quiesce process is complete, at an operation 426, the de-quiesce status information may be updated. For example, after receiving CMP from configuration agents 320, lock master IOH may finish system de-quiescing and change the status to "de-quiescing done." In an embodiment, the firmware at the master core may poll the IOH 316 to check the status of de-quiescing. Once "de-quiesce done" is polled, the master core may clear "de-quiesce" in IOH and execute codes to exit bsync mode or quiesce mode.

Figure 5:
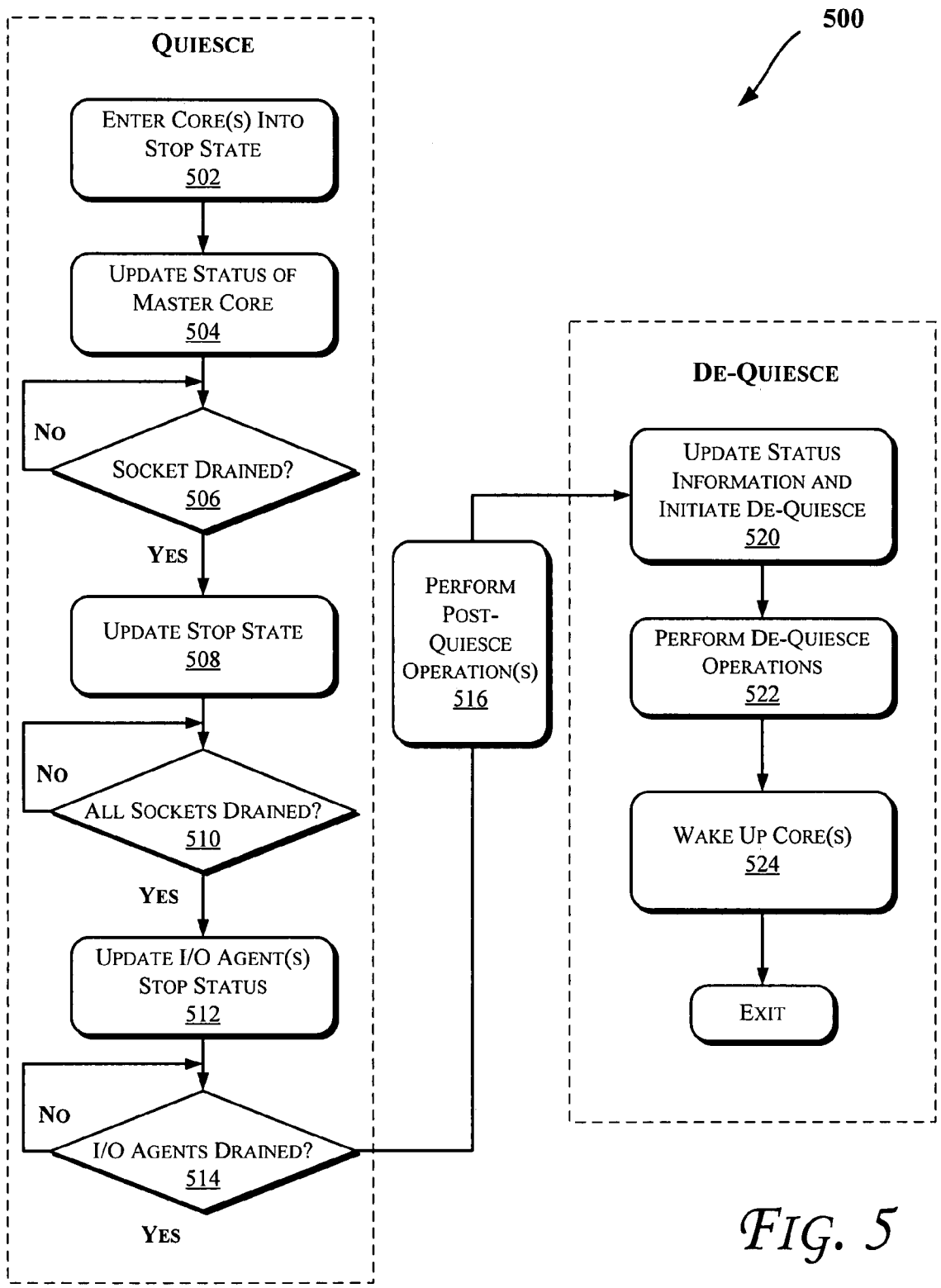

FIG. 5 illustrates a flow diagram of a method 500 to quiesce and de-quiesce a computing system, according to an embodiment. In an embodiment, the method 500 may be applied in a computing system with multiple processor cores and/or sockets, such as those discussed with reference to FIGS. 2, 3, and 6-7. Furthermore, various components discussed with reference to FIGS. 1-4 and 6-7 may be utilized to perform one or more of the operations discussed with reference to FIG. 5.

Referring to FIGS. 1-5, at an operation 502, cores present in a computing system (such as the cores 302 of system 300) may enter into "stop" state (also referred to as a "halt" state). In an embodiment, at operation 502, software may force all cores enter into a "stop" state except a master core (e.g., one of the cores 302). In one embodiment, the software that causes the cores to enter the halt state may be executing on the master core. At an operation 504, the status information corresponding to the master core may be updated. For example, the master core may set the "stop" bit in its own socket 316. In some embodiments, once the "stop" bit is set, no core may send any request out until the "stop" bit is cleared.

At an operation 506, it may be determined whether a corresponding socket is drained. If the socket is drained, at an operation 508, the "stop" state may be modified. In an embodiment, the configuration logic 320 of a socket may clear the "stop" bit once its socket is drained. At an operation 510, it may be determined whether all sockets are drained. In an embodiment, the master core may poll the drain status bit in every other CPU socket. At an operation 512, once all the sockets are drained, the stop status of the I/O agent(s) (such as the IOH 316) is updated. In an embodiment, once all CPU sockets are drained, master core may set the "stop" bits in I/O agents. For example, at operation 512, "stop" bits corresponding to the memory 314 and/or device 208 may be set to indicate that no I/O data is to be accepted.

At an operation 514, it may be determined whether a corresponding socket is drained. For example, the master core polls the drain status bits in I/O agents. Once all I/O agents are drained (as determined by an operation 514), the computing system (e.g., the system 300) is quiesced. In an embodiment, the "stop" bits of I/O agents may not be automatically cleared. At an operation 516, various post-quiesce operations may be performed. For example, one or more tasks such as discussed with reference to the operation 416 of FIG. 4 may be performed.

Once the task(s) of operation 516 are done, the de-quiesce sequence may be initiated at operation 520. At an operation 522, one or more operations associated with the de-quiesce process may be performed. For example, the master core may clear "stop" bits in I/O agents. At an operation 524, the master core may send wake-up events to all the cores that entered into "stop" state at operation 502, e.g., to cause those cores to exit the "stop" status. After operation 524, the master core may exit the bsync software/firmware.

Figure 6:
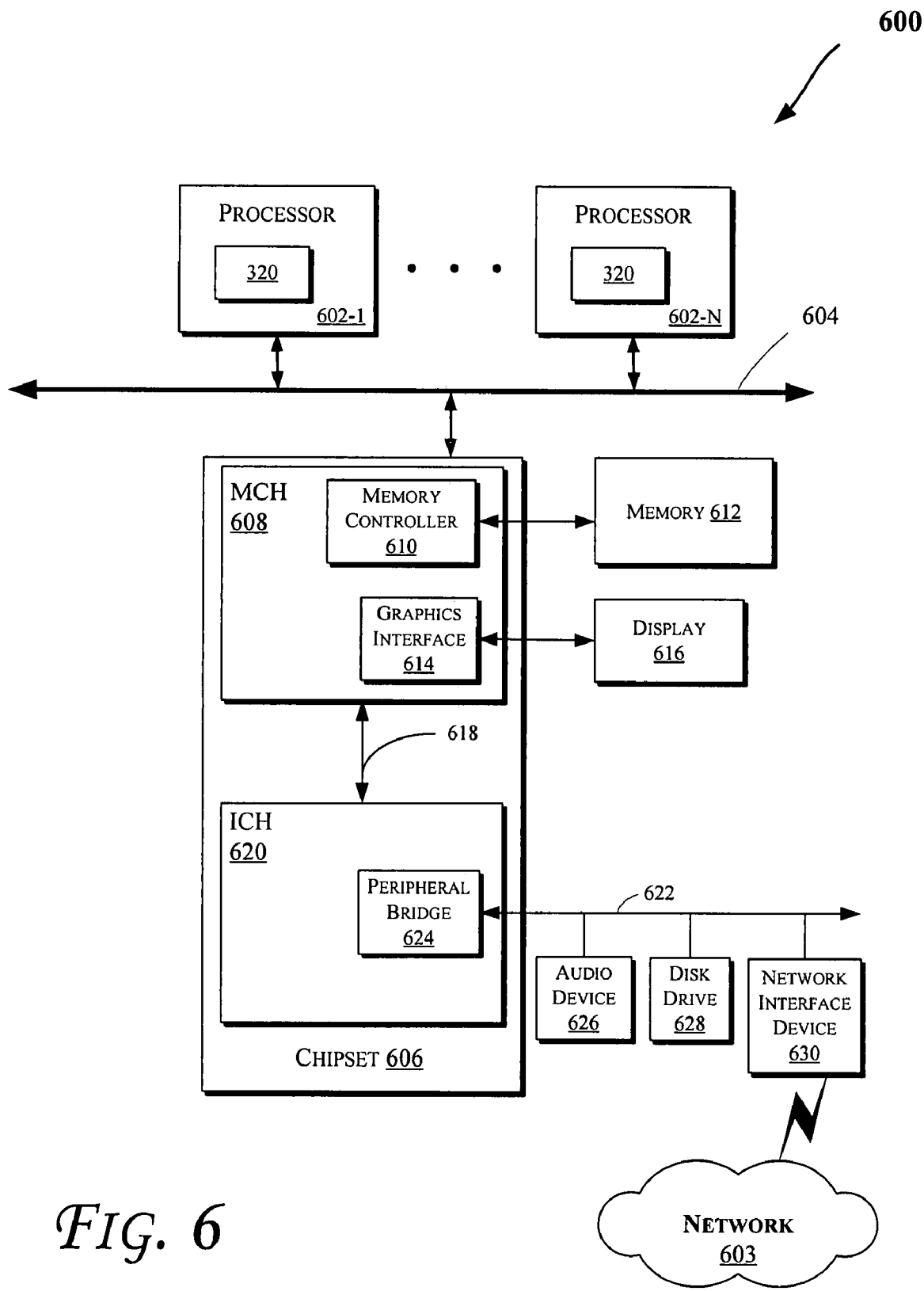

FIG. 6 illustrates a block diagram of a computing system 600 in accordance with an embodiment of the invention. The computing system 600 may include one or more central processing unit(s) (CPUs) 602-1 through 602-N or processors (collectively referred to herein as "processors 602" or more generally "processor 602") that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. Also, the operations discussed with reference to FIGS. 1-5 may be performed by one or more components of the system 600. In some embodiments, the processors 602 may be the same or similar to the processors 202 of FIG. 2. Furthermore, the processors 602 may include one or more cores (such as the cores 302 of FIG. 3).

A chipset 606 may also communicate with the interconnection network 604. The chipset 606 may include a memory controller hub (MCH) 608. The MCH 608 may include a memory controller 610 that communicates with a memory 612. The memory 612 may store data, including sequences of instructions that are executed by the CPU 602, or any other device included in the computing system 600. For example, the memory 612 may store data corresponding to an operation system (OS). In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

Additionally, one or more of the processors 602 may have access to one or more caches (which may include private and/or shared caches in various embodiments) and associated cache controllers (not shown). The cache(s) may adhere to one or more cache coherent protocols. The cache(s) may store data (e.g., including instructions) that are utilized by one or more components of the system 600. For example, the cache may locally cache data stored in a memory 612 for faster access by the components of the processors 602. In an embodiment, the cache (that may be shared) may include a mid-level cache and/or a last level cache (LLC). Also, each processor 602 may include a level 1 (L1) cache. Various components of the processors 602 may communicate with the cache directly, through a bus or interconnection network, and/or a memory controller or hub. Also, each of the processors 602 (or each core present in the processors 602) may include the configuration logic 320 in some embodiments.

The MCH 608 may also include a graphics interface 614 that communicates with a display device 616, e.g., via a graphics accelerator. In one embodiment of the invention, the graphics interface 614 may communicate with the graphics accelerator via an accelerated graphics port (AGP). In an embodiment of the invention, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O devices that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices (such as device(s) 208 of FIG. 2). Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some embodiments of the invention. In addition, the processor 602 and the MCH 608 may be combined to form a single chip. Furthermore, the graphics interface 614 may be included within the MCH 608 in other embodiments of the invention.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
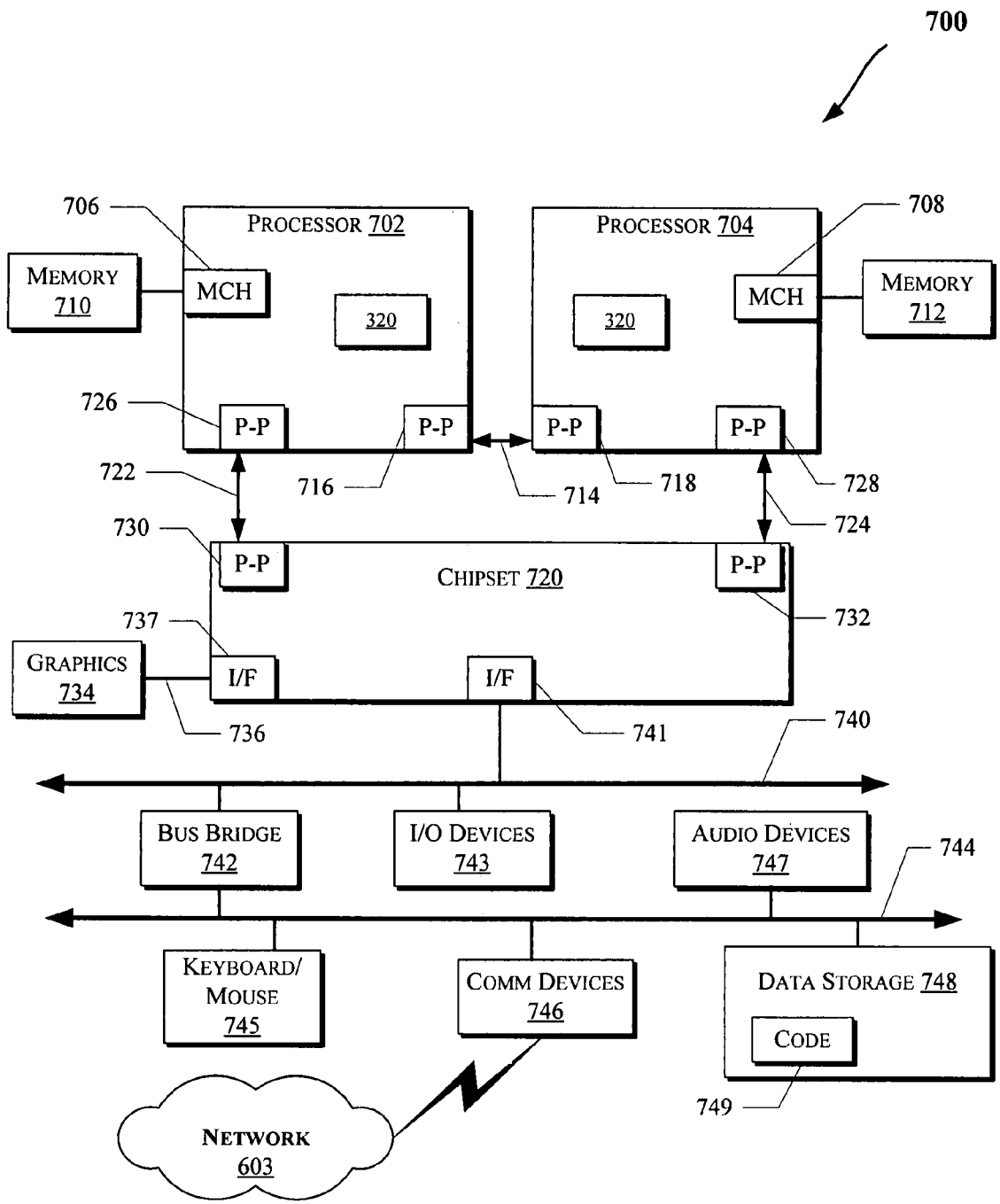

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. The operations discussed with reference to FIGS. 1-6 may be performed by one or more components of the system 700.

As illustrated in FIG. 7, the system 700 may include several processors, of which only two, processors 702 and 704 are shown for clarity. The processors 702 and 704 may each include a local memory controller hub (MCH) 706 and 708 to enable communication with memories 710 and 712. The memories 710 and/or 712 may store various data such as those discussed with reference to the memory 612 of FIG. 6. As shown in FIG. 7, the processors 702 and 704 may also include the cache(s) discussed with reference to FIG. 6.

In an embodiment, the processors 702 and 704 may be one of the processors 602 discussed with reference to FIG. 6. The processors 702 and 704 may exchange data via a point-to-point (PtP) interface 714 using PtP interface circuits 716 and 718, respectively. Also, the processors 702 and 704 may each exchange data with a' chipset 720 via individual PtP interfaces 722 and 724 using point-to-point interface circuits 726, 728, 730, and 732. The chipset 720 may further exchange data with a high-performance graphics circuit 734 via a high-performance graphics interface 736, e.g., using a PtP interface circuit 737.

At least one embodiment of the invention may be provided within the processors 702 and 704 or chipset 720. For example, the logic 320 may be provided within the processors 702 and 704 (or within each core of the processors 702 and/or 704). Other embodiments of the invention, however, may exist in other circuits, logic units, or devices within the system 700 of FIG. 7. Furthermore, other embodiments of the invention may be distributed throughout several circuits, logic units, or devices illustrated in FIG. 7.

The chipset 720 may communicate with a bus 740 using a PtP interface circuit 741. The bus 740 may have one or more devices that communicate with it, such as a bus bridge 742 and I/O devices 743. Via a bus 744, the bus bridge 742 may communicate with other devices such as a keyboard/mouse 745, communication devices 746 (such as modems, network interface devices, or other communication devices that may communicate with the computer network 603), audio I/O device, and/or a data storage device 748. The data storage device 748 may store code 749 that may be executed by the processors 702 and/or 704.

In various embodiments of the invention, the operations discussed herein, e.g., with reference to FIGS. 1-7, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-7. Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
a first processor to perform one or more operations corresponding to a quiesce process; and
a configuration logic to modify one or more bits to indicate a status of the quiesce process, wherein the first processor performs one or more post-quiesce operations in response to an indication that the quiesce process is completed and wherein the post-quiesce operations are to comprise execution of one or more of: dynamic domain partitioning (DDP) or a periodic system management interrupt (PSMI).

2. The apparatus of claim 1, wherein the configuration logic is to modify the one or more bits to indicate a completion status or an initiation status of the quiesce process.

3. The apparatus of claim 1, further comprising one or more of a caching logic, an interface logic, or home logic, wherein the configuration logic is to modify the one or more bits that initiate one or more actions directed to the caching logic, the interface logic, or the home logic.

4. The apparatus of claim 1, wherein the first processor initiates the quiesce process in response to execution of an instruction.

5. The apparatus of claim 1, wherein the post-quiesce operations comprise execution of one or more of software corresponding to reliability, accessibility, and serviceability (RAS) features, dynamic domain partitioning (DDP), hot device add, or hot device removal.

6. The apparatus of claim 1, wherein the first processor comprises one or more processor cores with one or more hardware threads.

7. The apparatus of claim 1, wherein the first processor is to perform one or more operations corresponding to a de-quiesce process.

8. The apparatus of claim 1, further comprising a socket and point to point interface to couple a first socket of the first processor to a second socket of a second processor, wherein each of the first or second sockets is coupled to one or more of: a core, an interface logic, a caching logic, a home logic, a router, or a physical layer agent.

9. The apparatus of claim 1, further comprising an input/output hub (IOH) to communicate data between the first processor and one or more components of a computing system, wherein the IOH is to act as a lock master to allow only one core as a master core to take control of the entire computing system for dynamic domain partitioning (DDP).

10. A method comprising:
    initiating a quiesce process;
    modify one or more bits to indicate a status of the quiesce process; and
    performing one or more post-quiesce operations, in response to an indicator that the quiesce process is completed wherein the post-quiesce operations to comprise execution of one or more of: dynamic domain partitioning (DDP) or a periodic system management interrupt (PSMI).

11. The method of claim 10, further comprising performing one or more de-quiesce operations in response to completion of the one or more post-quiesce operations.

12. The method of claim 11, further comprising waking up one or more cores of a computing system in response to completion of the de-quiesce process.

13. The method of claim 10, further comprising updating the one or more bits to initiate the quiesce process, a dequiesce process, or a sampling of one or more control register status bits in response to one or more of: initiation of the quiesce process; completion of the quiesce process, completion of post-quiesce operations, initiation of a de-quiesce process, or completion of the de-quiesce process.

14. The method of claim 10, further comprising entering one or more cores of a computing system into a "stop" state initiated by a software module to cause a configuration status register write (CSR write) to initiate the quiesce process.

15. A computing system comprising:
    a plurality of processors, wherein a first one of the plurality of processors performs one or more operations corresponding to a quiesce process;
    a memory unit to store one or more bits to indicate a status of the quiesce process; and
    a configuration agent to modify the one or more bits in response to one or more events corresponding to the quiesce process, wherein the first processor performs one or more post-quiesce operations in response to an indication that the quiesce process is completed and wherein the post-quiesce operations are to comprise execution of one or more of: dynamic domain partitioning (DDP) or a periodic system management interrupt (PSMI).

16. The system of claim 15, further comprising an input/output hub to communicate data between the first processor and one or more components of the computing system.

17. The system of claim 15, further comprising a socket to couple the first processor to a second one of the plurality of processors.

18. The system of claim 15, wherein the one or more events correspond to one or more of: initiation of the quiesce process; completion of the quiesce process, completion of post-quiesce operations, initiation of a de-quiesce process, or completion of the de-quiesce process.

19. The system of claim 15, further comprising an audio device.

* * * * *